(12) United States Patent
Lu

(10) Patent No.: US 6,862,042 B2
(45) Date of Patent: Mar. 1, 2005

(54) SLIDING LENS CAP APPARATUS WITH CLOSE-UP AND START-UP FUNCTIONS

(75) Inventor: Jih-Yung Lu, Sanchung (TW)

(73) Assignee: Benq Corporation, Taoyuan (TW)

( * ) Notice: Subject to any disclaimer, the term of this patent is extended or adjusted under 35 U.S.C. 154(b) by 610 days.

(21) Appl. No.: 10/046,087

(22) Filed: Jan. 16, 2002

(65) Prior Publication Data

US 2002/0093584 A1 Jul. 18, 2002

(30) Foreign Application Priority Data

Jan. 18, 2001 (TW) ........................................ 90101198 A

(51) Int. Cl.$^7$ .............................................. H04N 5/225
(52) U.S. Cl. .................. 348/335; 348/375; 348/207.99; 396/72
(58) Field of Search ........................ 348/207.99, 220.1, 348/335, 340, 341, 342, 375, 362, 363; 396/72, 448, 85, 144

(56) References Cited

U.S. PATENT DOCUMENTS 5,294,954 A * 3/1994 Nomura et al. ............. 396/448
5,321,462 A * 6/1994 Haraguchi et al. ............ 396/85
6,532,341 B2 * 3/2003 Jih-Yung ...................... 396/72

FOREIGN PATENT DOCUMENTS

JP 11-72835 * 3/1999 ........... G03B/17/12

* cited by examiner

*Primary Examiner*—Tuan Ho
(74) *Attorney, Agent, or Firm*—Rabin & Berdo, P.C.

(57) ABSTRACT

A sliding lens cap apparatus with close-up and start-up functions is disclosed. The apparatus is equipped in a camera and the camera includes a lens and a lens cap. The lens includes a lens pull rod for adjusting the focal length. The apparatus comprises an orientation rod, a fixed rod and a sliding rod. The orientation rod and fixed rod are coupled fixedly to the camera and form a track for the lens to move along. The orientation rod comprises a close orientation indent, an open orientation indent, and a close-up orientation indent. The sliding rod is movably coupled to the fixed rod and comprises a lens frame coupled to the lens pull rod. When the lens cap moves between the open orientation indent and the close-up orientation indent, the lens cap promotes the sliding rod to shift. By means of the movement of the lens cap, the camera can switch among the close mode, open mode, or close-up mode. The apparatus of the invention can provide easy usage and achieve the design of saving inner camera space and material cost.

13 Claims, 3 Drawing Sheets

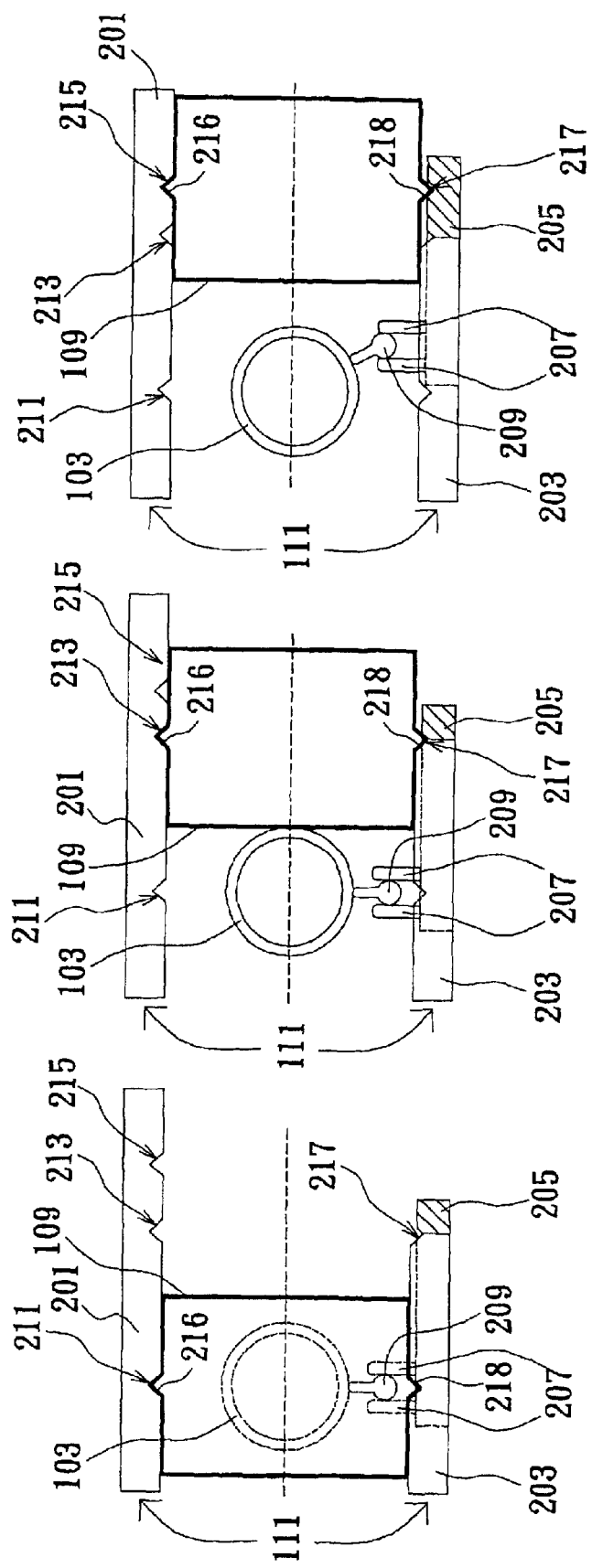

SLIDING LENS CAP APPARATUS WITH CLOSE-UP AND START-UP FUNCTIONS

BACKGROUND OF THE INVENTION

This application incorporates by reference Taiwanese application Ser. No. 90101198, Filed Jan. 18, 2001.

1. Field of the Invention

The invention relates in general to an improved camera mechanism, and more particularly, to a sliding lens cap apparatus capable of directly switching to the close-up function of a camera.

2. Description of the Related Art

Nowadays, when people try to keep visual reminders of a wonderful scenery or person, a camera is frequently utilized to capture the images. Usually, the common camera has a lens cap for protecting the lens from damage and from dust pollution. When the lens cap covers the lens, the camera is in a close mode. And before taking a picture, the user must activate the camera's open/close button to uncover the lens cap from the lens. The camera then is changed to an open mode and is ready for the user to take a picture.

In addition, the camera provides a close-up mode for the user to photograph shorter-distance objects. The user can press the close-up function button to set the camera in a close-up mode, in order to adjust the focal length of the lens accordingly. Generally, the traditional camera has one button for controlling the open/close mechanism and another one button for controlling the close-up mechanism. As a result, the user must manipulate two buttons: one is the open/close button to turn on the camera and another one is the close-up function button to set the camera in the close-up mode. These two buttons operate separate mechanisms and the usage is inconvenient for the user. Furthermore, the mechanisms of these buttons occupy more space within the camera than the single mechanism of the invention.

SUMMARY OF THE INVENTION

It is therefore an object of the invention to provide a sliding lens cap apparatus with close-up and start-up functions. The invention utilizes the movement of the lens caps on the sliding lens cap apparatus to set the camera in an open mode, and because said apparatus is coupled to the lens, it can also adjust the focal length of the camera and directly switch the camera into a close-up mode. The user needs to manipulate only the sliding lens cap apparatus to simultaneously achieve the two functions. In addition, the structural design of the apparatus can save inner space of the camera and economize the material cost.

The invention achieves the above-identified objects by providing a sliding lens cap apparatus with close-up and start-up functions. The sliding lens cap apparatus is equipped in a camera and the camera includes a lens and a lens cap. The lens includes a lens pull rod for adjusting the focal length of the lens. The sliding lens cap apparatus comprises an orientation rod, a fixed rod, and a sliding rod. The orientation rod is fixedly coupled to the camera and comprises a close orientation indent, an open orientation indent, and a close-up orientation indent. The fixed rod is also fixedly coupled to the camera. Furthermore, the fixed rod and the orientation rod form a track along which the lens can move. The sliding rod can be movably coupled to the fixed rod and comprises a lens frame that is coupled to the lens pull rod. When the lens cap moves between the open orientation indent and the close-up orientation indent, the lens promotes the sliding rod to shift and the lens frame promotes the lens pull rod to move, in order to adjust the focal length of the lens. When the lens cap is located at the close orientation indent, the lens cap covers the lens and the camera is in a close mode. When the lens cap is located at the open orientation indent, the lens cap is open and the camera is in an open mode. And when the lens cap is located at the close-up orientation indent, the camera is in a close-up mode.

BRIEF DESCRIPTION OF THE DRAWINGS

Other objects, features, and advantages of the invention will become apparent from the following detailed description of the preferred but non-limiting embodiments. The description is made with reference to the accompanying drawings, in which:

FIG. 2A is a sketch diagram of the sliding lens cap apparatus coupled to the lens cap and the lens when the camera of FIG. 1 is in the close mode;

FIG. 2B is a sketch diagram of the sliding lens cap apparatus coupled to the lens cap and the lens when the camera of FIG. 1 is in the open mode;

FIG. 2C is a sketch diagram of the sliding lens cap apparatus coupled to the lens cap and the lens when the camera of FIG. 1 is in the close-up mode;

DESCRIPTION OF THE PREFERRED EMBODIMENT

Figure 1:
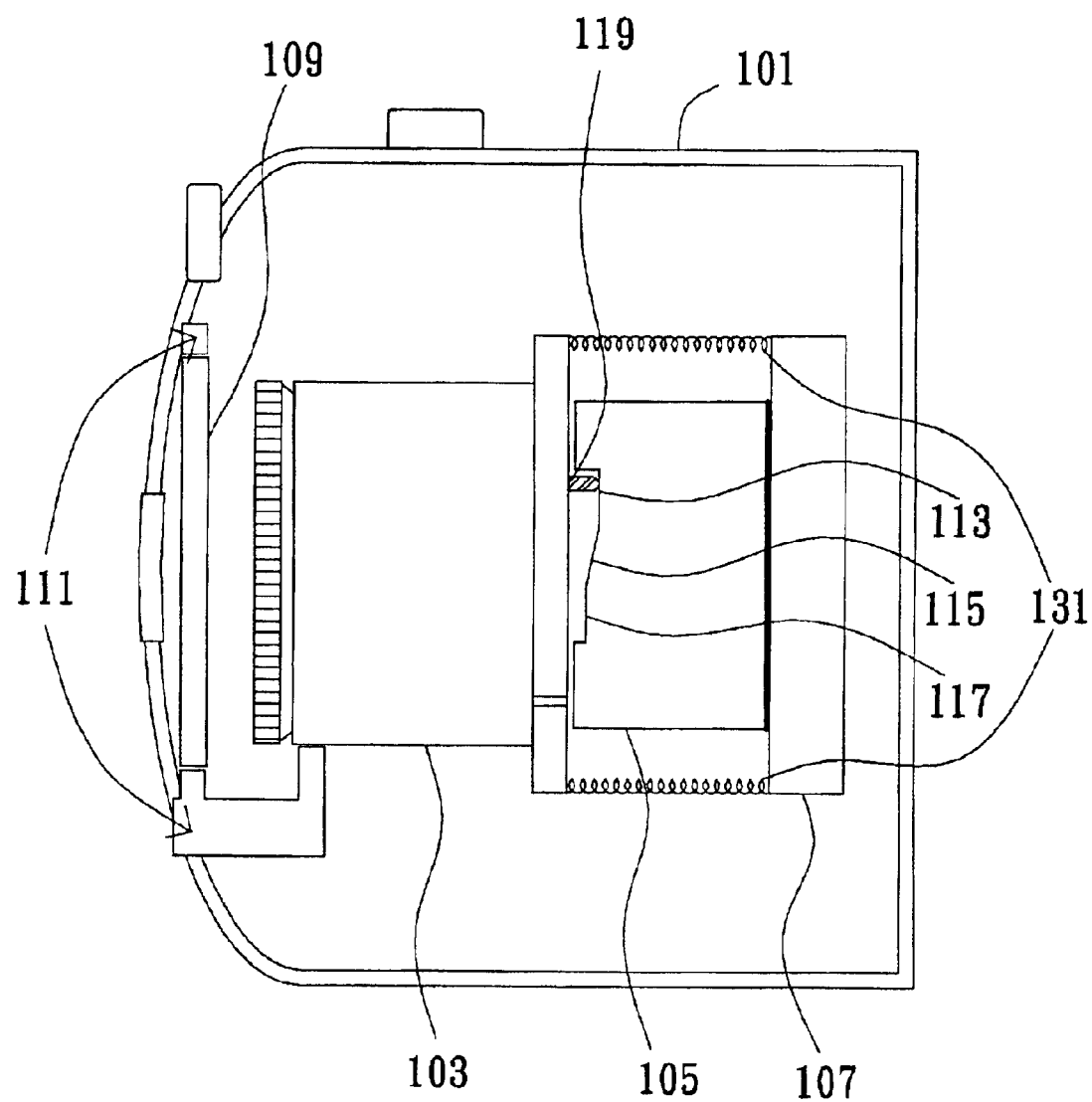
FIG. 1 is a lateral structural diagram of a sliding lens cap apparatus equipped in a camera according to a preferred embodiment of the invention.

Referring first to FIG. 1, it shows a lateral structural diagram of a sliding lens cap apparatus equipped in a camera according to a preferred embodiment of the invention. In FIG. 1, the camera 100 includes a body 101, a lens 103, a base 105, a light-sensing component 107, a lens cap 109 and a sliding lens cap apparatus 111. The concept of capturing an image by the camera 100 is that light enters the camera 100 through the lens 103 and is focalized. The focalized light then goes through the base 105 and is received by the light-sensing component 107 for imaging. And the camera 100 can be a camera that uses film to store the image, or a digital camera. As shown in FIG. 1, the camera 100 further comprises a spring 131 for securing the lens 103 and the light-sensing component 107.

The lens 103 can be rotated to move along the direction of the axis of the focalized light. The design of the mechanism for rotating the lens 103, in order to adjust the focal length, is as follows. The side of the base 105 is coupled to the lens 103 and includes a low plane 113, an inclined plane 115, and a high plane 117. And the depth of the low plane 113 (the distance between the lower plane 113 and the lens 103) is larger then the depth of the high plane 117 (the distance between the high plane 117 and the lens 103).

Moreover, the lens 103 includes a post 119. When the lens 103 is rotated, the post 119 is promoted to move on the low plane 113, the inclined plane 115, or the high plane 117. When the post 119 moves from the low plane 113 to the high plane 117, the post 119 shores up the high plane 117 enabling the lens 103 to move along the direction of the axis of the focalized light in order to increase the focal length of the camera 100. And when the post 119 moves from the high plane 117 to the low plane 113, the elasticity of the spring 131 enables the lens 103 to move nearer to the light-sensing component 107, thus decreasing the focal length of the camera 100. As a result, the focal length can be adjusted by rotating the lens 103.

The camera 100 includes a close mode, an open mode and a close-up mode. The invention manipulates the lens cap 109 to travel on the sliding lens cap apparatus 111 and to promote the lens 103 to rotate, in order to switch among the above modes of the camera 100. Referring to FIG. 2A, it is a sketch diagram of the sliding lens cap apparatus 111 coupled to the lens cap 109 and the lens 103, when the camera 100 of FIG. 1 is in the close mode. In FIG. 2A, the lens 103 includes a lens pull rod 209 for adjusting the focal length of the lens 103. And the sliding lens cap apparatus 111 includes an orientation rod 201, a fixed rod 203 and a sliding rod 205. The orientation rod 201 is fixedly coupled to the body 101 and includes a close orientation indent 211, an open orientation indent 213, and a close-up orientation indent 215. The fixed rod 203 is also fixedly coupled to the body 101. In addition, the fixed rod 203 and the orientation rod 201 form a track and the lens cap 109 is capable of moving back and forth along the track. The side of the lens cap 109 is coupled to the orientation rod 201, and further includes an orientation wedge 216. When the lens cap 109 moves, the orientation wedge 216 seizes the close orientation indent 211, the open orientation indent 213, or the close-up orientation indents 215. The above design enables the lens cap 109 to reach these orientation indents more exactly, allowing the user to detect when the lens cap 109 is securely positioned in one of these indents.

The sliding rod 205 is movably coupled to the fixed rod 203 and includes a lens frame 207. The lens frame 207 is coupled to the lens pull rod 209. And when the sliding rod 205 moves, the lens frame 207 promotes the lens pull rod 209 to shift in order to rotate the lens 103 and to adjust the focal length.

In addition, as shown in FIG. 2A, the design of the sliding rod 205 is different from that of the fixed rod 203, in that the sliding rod 205 is not tightly coupled to the lens cap 109. The design of the sliding rod 204 includes a gap between the sliding rod 205 and lens cap 109. The design purpose of the gap is that: when the lens cap 109 moves between the close orientation indent 211 and the open orientation indent 213, the lens cap 109 does not promote the sliding rod 205 to shift. And the sliding rod 205 further includes a sliding indent 217. When the lens cap 109 moves to the open orientation indent 213 or the close-up orientation indent 215, the lens cap 109 can promote the sliding rod 205 to shift by means of being coupled to the sliding indent 217. Accordingly, the focal length of the lens 103 can be adjusted. The side of the lens cap 109 is coupled to the fixed rod 203 and further includes a promoting wedge 218. When the lens cap 109 moves between the open orientation indent 213 and the close-up orientation indent 215, the promoting wedge 218 is coupled to the sliding indent 217 and aids the lens cap 109 in promoting the sliding rod 205 to shift. The width of the gap between the sliding rod 205 and the lens cap 109 can be designed according to practical situations, to achieve the above object.

Figure 3B:
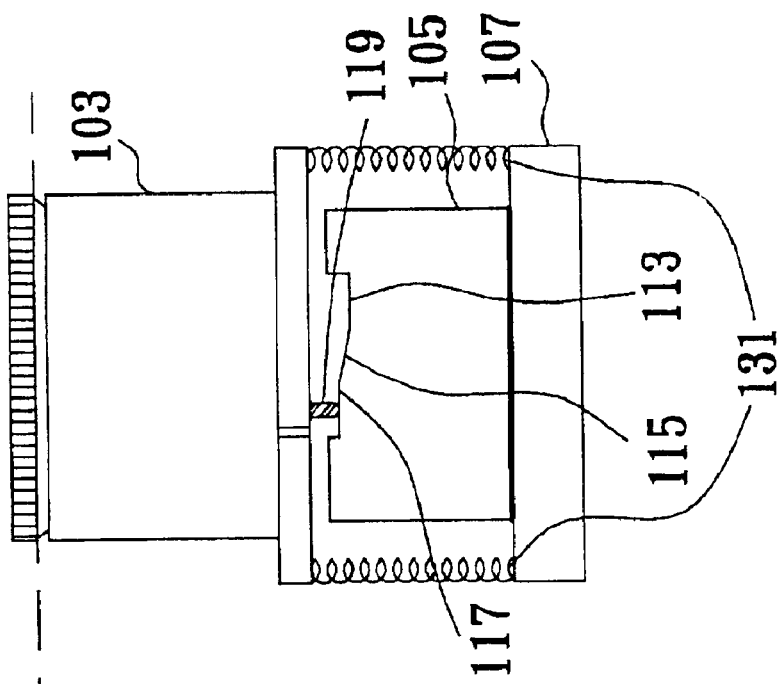
FIG. 3B is a lateral sketch diagram of the lens coupled to the base of the camera of FIG. 1 in the close-up mode.
Figure 3A:
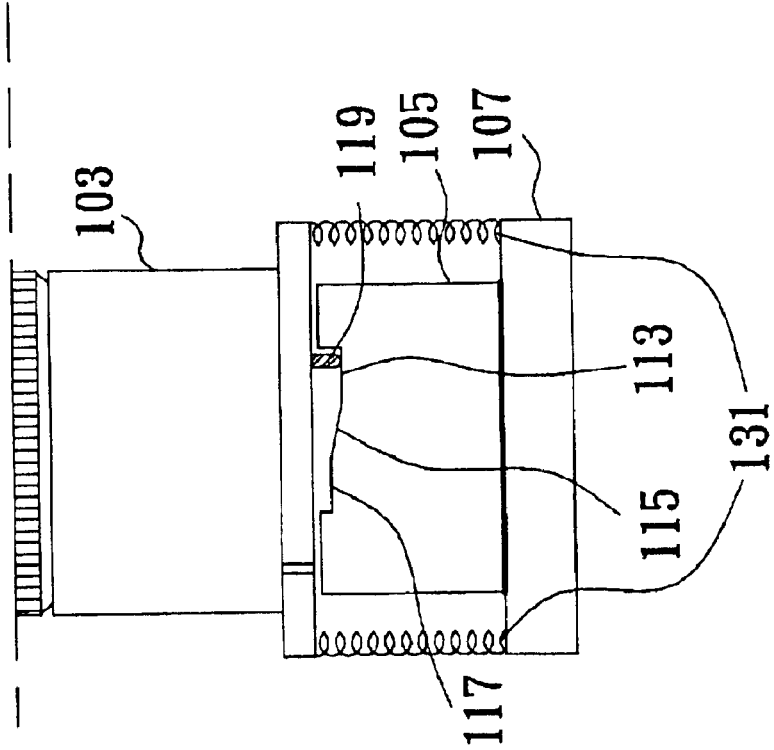
FIG. 3A is a lateral sketch diagram of the lens coupled to the base of the camera of FIG. 1 in the close mode and the open mode.

Simultaneously referring to FIGS. 2A, 2B, 2C, 3A, and 3B, when the orientation wedge 216 of the lens cap 109 moves to the close orientation indent 211, open orientation indent 213, or close-up orientation indent 215, the camera 100 respectively switches to a close mode, an open mode and a close-up mode. As shown in the FIG. 2A, the orientation wedge 216 is located at the close orientation indent 211 and accordingly, the lens cap 109 covers the lens 103 precisely. The camera 100 is in the close mode, and as shown in FIG. 3A, the post 119 of the lens 103 is located on the low plane 113 of the base 105.

Then, as shown in FIG. 2B, the orientation wedge 216 moves from the close orientation indent 211 to the open orientation indent 213. FIG. 2B is a sketch diagram of the sliding lens cap apparatus coupled to the lens cap 109 and the lens 103 when the camera 100 of FIG. 1 is in the open mode. In FIG. 2B, the lens cap 109 does not cover the lens 103 and the camera 100 is in the open mode, instead of the close mode. In the meantime, because the sliding rod 205 has not moved, the focal length of the lens 103 remains unchanged, in the open mode shown in FIG. 3A.

Next referring to FIGS. 2C and 3B, FIG. 2C is a sketch diagram of the sliding lens cap apparatus 111 coupled to the lens cap 109 and the lens 103 when the camera 100 of FIG. 1 is in the close-up mode, and FIG. 3B is a lateral sketch diagram of the lens 103 coupled to the base 105 of the camera 100 of FIG. 1 in the close-up mode. As shown in FIG. 2C, when the orientation wedge 216 moves from the open orientation indent 213 to the close-up orientation indent 215, the lens cap 109 promotes the sliding rod 205 to shift and enables the lens frame 207 to promote the lens pull rod 209 to rotate the lens 103. At the same time, as shown in FIG. 3B, the post 119 is moved along the inclined plane 115 to the high plane 117, enabling the lens 103 to move along the direction of the axis of the focalized light. As a result, the focal length of the lens 103 increases and the camera 100 changes from the open mode to the close-up mode.

When the orientation wedge 216 moves from the close-up orientation indent 215 to the open orientation 213, the lens cap 109 promotes the sliding rod 205 to shift and enables the lens frame 207 to promote the lens pull rod 209 to rotate the lens 103. Thus the lens 103 is set in the open mode, as shown in FIG. 3A, instead of the close-up mode shown in FIG. 3B. And the post 119 moves along the inclined plane 115 from the high plane 117 to the low plane 113. The focal length of the lens 103 is decreased and the camera 100 changes from the close-up mode to the open mode. Then when the orientation wedge 216 moves from the open orientation indent 213 to the close orientation indent 211, the lens caps 109 exactly covers the lens 103, and the camera 100 is switched to the close mode.

In the above description of the preferred embodiment, the invention is illustrated by taking the movement of the post 119 of the lens 103 on the base 105 as an example, but it is to be understood that the invention is not limited thereto. Any mechanism for rotating the lens to adjust the focal length of the camera is also an application of the invention.

The sliding lens cap apparatus disclosed in the preferred embodiment of the invention has the following advantages:

(1) easy usage: A user needs to operate only the sliding lens cap apparatus of the invention to achieve two functions: shifting the lens cap 109 to enable the camera 100 in the open mode and adjusting the focal length of the lens 103 to enable the camera in the close-up mode. It is different from a traditional camera that requires the user to manipulate different or separate buttons and mechanisms to achieve the above functions.

(2) saving inner space of the camera: The invention integrates the open/close button and the close-up button of a traditional camera in order to economize the space occupied within the camera.

(3) reducing the cost of material: The invention integrates the open/close button and the close-up button of a traditional camera in order to economize the material cost of the camera.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sliding lens cap apparatus with close-up and start-up functions, equipped in a camera, the camera including a lens and a lens cap, the lens including a lens pull rod for adjusting the focal length of the lens, the sliding lens cap apparatus comprising:

an orientation rod fixedly coupled to the camera, the orientation rod comprising a close orientation indent, an open orientation indent, and a close-up orientation indent;

a fixed rod fixedly coupled to the camera, the fixed rod and the orientation rod forming a track for the lens to move along; and a sliding rod capable of being movably coupled to the fixed rod, the sliding rod comprising a lens frame, the lens frame coupled to the lens pull rod for adjusting the focal length of the lens;

wherein when the lens cap is located at the close orientation indent, the lens cap is covered and the camera is in a close mode, when the lens cap is located at the open orientation indent, the lens cap is open and the camera is in an open mode, and when the lens cap is located at the close-up orientation indent, the camera is in a close-up mode.

2. The apparatus according to claim 1, wherein the sliding rod further comprises a sliding indent coupled to the lens cap to aid the lens cap in promoting the sliding rod to shift positions.

3. The apparatus according to claim 2, wherein the lens cap further comprises a promoting wedge and when the lens cap moves between the open orientation indent and the close-up orientation indent, the promoting wedge is for seizing the sliding indent.

4. The apparatus according to claim 1, wherein the lens cap further comprises an orientation wedge for seizing the close orientation indent, the open orientation indent, or the close-up orientation indent.

5. The apparatus according to claim 1, wherein the camera is a digital camera.

6. The apparatus according to claim 1, wherein the focal length of the lens is changeable and the focal length when the lens cap is positioned at the close-up orientation indent is longer than the focal length when the lens cap is positioned at the open orientation indent.

7. A camera with close-up and start-up functions, comprising a sliding lens cap apparatus, a lens, a base and a lens cap, the lens including a lens pull rod for adjusting the focal length of the lens, the sliding lens cap apparatus comprising:

an orientation rod fixedly coupled to the camera, the orientation rod comprising a close orientation indent, an open orientation indent, and a close-up orientation indent;

a fixed rod fixedly coupled to the camera, the fixed rod and the orientation rod forming a track for the lens to move along the track; and a sliding rod capable of being movably coupled to the fixed rod, the sliding rod comprising a lens frame, the lens frame coupled to the lens pull rod for adjusting the focal length of the lens;

wherein when the lens cap is located at the close orientation indent, the lens cap covers the lens and the camera is in a close mode, when the lens cap is located at the open orientation indent, the lens cap is uncovered from the lens and the camera is in an open mode, and when the lens cap is located at the close-up orientation indent, the camera is in a close-up mode.

8. The camera according to claim 7, wherein the sliding rod further comprises a sliding indent coupled to the lens cap to aid the lens cap in promoting the sliding rod to shift positions.

9. The camera according to claim 8, wherein the lens cap further comprises a promoting wedge and when the lens cap moves between the open orientation indent and the close-up orientation indent, the promoting wedge is for seizing the sliding indent.

10. The camera according to claim 7, wherein the lens cap further comprises an orientation wedge for seizing the close orientation indent, the open orientation indent, or the close-up orientation indent.

11. The camera according to claim 7, wherein the camera is a digital camera.

12. The camera according to claim 7, wherein the lens further comprises a post and when the lens cap is located at the close orientation indent or the open orientation indent, the post shores up the a low plane of the base.

13. The camera according to claim 12, wherein when the lens cap is located at the close-up orientation indent, the post shores up a high plane of the base to change the focal length of the lens so that the focal length when the post shores up the high plane is longer than the focal length when the post shores up the low plane.

* * * * *